United States Patent
Zhong et al.

(10) Patent No.: US 10,761,697 B2
(45) Date of Patent: Sep. 1, 2020

(54) CALENDAR EVENT SCHEDULING FROM EMAIL

(71) Applicant: Microsoft Technology Licensing, LLC, Redmond, WA (US)

(72) Inventors: Lin Zhong, Bellevue, WA (US); Andrew James Peacock, Seattle, WA (US); Shahil Soni, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 15/198,170

(22) Filed: Jun. 30, 2016

(65) Prior Publication Data

US 2018/0004398 A1    Jan. 4, 2018

(51) Int. Cl.
| | | |
|---|---|---|
| *G06F 3/0484* | (2013.01) | |
| *G06Q 10/10* | (2012.01) | |
| *G06F 3/0486* | (2013.01) | |
| *H04L 12/58* | (2006.01) | |
| *H04L 29/08* | (2006.01) | |

(52) U.S. Cl.
CPC ........ *G06F 3/04842* (2013.01); *G06F 3/0486* (2013.01); *G06Q 10/107* (2013.01); *G06Q 10/1093* (2013.01); *H04L 51/16* (2013.01); *H04L 51/22* (2013.01); *H04L 67/10* (2013.01)

(58) Field of Classification Search
CPC ... G06F 3/04842; G06F 3/0486; H04L 51/16; H04L 51/22; H04L 67/10; G06Q 10/107; G06Q 10/1093
See application file for complete search history.

(56) References Cited

U.S. PATENT DOCUMENTS

| | | |
|---|---|---|
| 7,353,466 B2 | 4/2008 | Crane et al. |
| 7,363,590 B2 | 4/2008 | Kerr et al. |
| 7,805,676 B2 | 9/2010 | Schemers et al. |
| 8,363,943 B2 | 1/2013 | Eklund |
| 8,407,665 B1 * | 3/2013 | Eddings ............... G06F 16/958 717/106 |
| 8,521,823 B1 | 8/2013 | Sheinberg et al. |
| 8,560,371 B2 | 10/2013 | Levitt |

(Continued)

FOREIGN PATENT DOCUMENTS

| | | |
|---|---|---|
| EP | 1793571 A1 | 6/2007 |
| EP | 2088547 A1 | 8/2009 |
| WO | 2011045771 A1 | 4/2011 |

OTHER PUBLICATIONS

Link a Gmail message to a Google Calendar Event Nov. 20, 2013 4 pages (Year: 2013).*

(Continued)

*Primary Examiner* — Andrea N Long
(74) *Attorney, Agent, or Firm* — Christopher J. Volkmann; Kelly, Holt & Christenson, PLLC

(57) ABSTRACT

An electronic mail (email) system generates an email user interface display, that allows the user to enter message content. A context-sensitive calendar preview can be triggered and displayed on the email user interface display. The email system detects a user drag and drop input dragging at least a portion of the message content onto the calendar preview, and automatically generates a calendar event based upon the detected drag and drop input, and the particular portion of the message content dragged onto the context-sensitive calendar preview.

17 Claims, 11 Drawing Sheets

(56) References Cited

U.S. PATENT DOCUMENTS

| | | | |
|---|---|---|---|
| 8,577,975 B2 | 11/2013 | Groves et al. | |
| 8,745,141 B2 | 6/2014 | Rosenberg et al. | |
| 8,905,315 B1 | 12/2014 | Qureshi | |
| 8,924,860 B2 | 12/2014 | Espinoza et al. | |
| 9,219,704 B2* | 12/2015 | Hamlin | H04L 51/36 |
| 9,383,951 B2 | 7/2016 | Logue et al. | |
| 9,626,657 B2 | 4/2017 | Schirmer et al. | |
| 2004/0243677 A1* | 12/2004 | Curbow | G06Q 10/107 709/206 |
| 2005/0102245 A1 | 5/2005 | Edlund et al. | |
| 2005/0149858 A1* | 7/2005 | Stern | G06Q 10/107 715/255 |
| 2006/0200374 A1 | 9/2006 | Nelken | |
| 2007/0073810 A1 | 3/2007 | Adams et al. | |
| 2007/0124371 A1* | 5/2007 | Desai | G06Q 10/107 709/204 |
| 2007/0244976 A1* | 10/2007 | Carroll | G06Q 10/107 709/206 |
| 2008/0015922 A1 | 1/2008 | Nelken | |
| 2008/0082925 A1* | 4/2008 | Brush | G06Q 10/1093 715/744 |
| 2008/0294994 A1 | 11/2008 | Kruger et al. | |
| 2009/0094088 A1 | 4/2009 | Chen et al. | |
| 2009/0100332 A1* | 4/2009 | Kanjilal | G06Q 10/107 715/235 |
| 2009/0281843 A1 | 11/2009 | Coffman et al. | |
| 2009/0319319 A1 | 12/2009 | Oral et al. | |
| 2010/0010864 A1 | 1/2010 | Lee et al. | |
| 2010/0070877 A1 | 3/2010 | Scott et al. | |
| 2010/0179961 A1 | 7/2010 | Berry et al. | |
| 2010/0180212 A1 | 7/2010 | Gingras et al. | |
| 2010/0223089 A1* | 9/2010 | Godfrey | G06Q 10/1095 705/7.19 |
| 2010/0293029 A1 | 11/2010 | Olliphant | |
| 2011/0072372 A1 | 3/2011 | Fritzley et al. | |
| 2011/0106892 A1 | 5/2011 | Nelson et al. | |
| 2011/0184772 A1 | 7/2011 | Norton et al. | |
| 2011/0252351 A1 | 10/2011 | Sikora et al. | |
| 2012/0324002 A1 | 12/2012 | Chen | |
| 2014/0067454 A1 | 3/2014 | Varoglu et al. | |
| 2014/0200942 A1 | 7/2014 | Benjamin | |
| 2014/0288990 A1 | 9/2014 | Moore et al. | |
| 2015/0058425 A1 | 2/2015 | Nathan et al. | |
| 2015/0074558 A1 | 3/2015 | Haskins et al. | |
| 2015/0081369 A1* | 3/2015 | Sarrazin | G06Q 10/107 705/7.18 |
| 2015/0112749 A1 | 4/2015 | Erdal | |
| 2015/0135088 A1 | 5/2015 | Lim et al. | |
| 2015/0143258 A1 | 5/2015 | Carolan et al. | |
| 2015/0347982 A1 | 12/2015 | Jon et al. | |
| 2015/0347983 A1 | 12/2015 | Jon et al. | |
| 2017/0329494 A1 | 11/2017 | Zhong et al. | |

OTHER PUBLICATIONS

William Lefkovics What is the meeting request calendar preview in Outlook 2010 and how does it work? Mar. 22, 2012 5 pages (Year: 2012).*

Microsoft Office Outlook 2010 279 pages (Year: 2010).*

Christian Zibreg "How to disable suggested events in Calendar on iOS and Mac" Nov. 16, 2015 (Year: 2015).*

"The Events Calendar", Retrieved on: Sep. 14, 2016 Available at: https://theeventscalendar.com/knowledgebase/featured-images/.

"Yahoo", Published on: Sep. 14, 2006 Available at: http://files.shareholder.com/downloads/YHOO/0x0x52216/a235c41f-e0fa-475e-b748-189d52624fe8/YHOO_News_2006_9_14_General.pdf.

Foulkes, Tracey, "Email Management: Creative functions for Outlook Calendar", Published on: Aug. 1, 2013 Available at: http://productivityplayground.com/2013/08/email-management-creative-functions-for-outlook-calendar-2/.

"Handle", Retrieved on: Apr. 11, 2016 Available at: http://www.handle.com/.

"Drag and Drop Email in the Calendar to Create Appointments", Published on: Sep. 12, 2014 Available at: http://www.outlook-tips.net/tips/drag-drop-email-calendar-create-appointments/.

"Legal Calendaring and email software for law firms", Retrieved on: Apr. 11, 2016 Available at: http://www.practicepanther.com/legal-calendaring-software-law-firms/.

Smith, et al., "Introducing Calendars", Published on: Jan. 29, 2014 Available at: https://blog.asana.com/2014/01/calendars/.

International Search Report and Written Opinion for International Patent Application No. PCT/US2017/038926, dated Aug. 18, 2017, date of filing: Jun. 23, 2017, 14 pages.

"Advanced Outlook": Retrieved from: http://home.purchase.edu/sharedmedia/cis/Advanced-Outlook-Calendars-and-Meeting-Planner.pdf, Sep. 6. 2006, 11 Pages.

"Assistant.to App", Retrieved from: https://web.archive.org/web/20150920105922/http:/www.assistant.to:80/index.html, Sep. 20, 2015, 05 Pages.

"Boomerang Calendar Features Tour", Retrieved from: https://boomerang.calendar.com/features.html, Aug. 5, 2013, 5 Pages.

"Final Office Action Issued in U.S. Appl. No. 15/151,103", dated Aug. 12, 2019, 14 Pages.

"Non Final Office Action Issued in U.S. Appl. No. 15/151,103", dated Jan. 10, 2019, 16 Pages.

Bailey, Craig, "TIP; Sending Free Time Details in Outlook", Retrieved from: http:///www.craigbailey.net/tip-sending-free-time-details-in-outlook/, Jan. 8, 2008, 05 Pages.

"International Search Report and Written Opinion Issued in PCT Application No. PCT/US17/029741", dated Jul. 13, 2017, 13 Pages.

* cited by examiner

CALENDAR EVENT SCHEDULING FROM EMAIL

BACKGROUND

Computer systems are currently in wide use. Some such computer systems include electronic mail systems. Electronic mail systems allow users to compose, send and receive electronic mail messages and perform other electronic mail system functionality.

Other computing systems include calendar or scheduling systems. Calendar or scheduling systems allow users to perform calendar or scheduling functions, such as to generate calendar events which are entered on the user's calendar. Such calendar events may include meetings, appointments, tasks, etc. Calendar events can also include such things as generating a meeting request or other interactive functions.

Users of such systems often communicate using electronic mail systems, and set up meetings with one another or schedule telephone calls, etc., using the calendar or scheduling system. In addition, it is not uncommon for users to communicate over different communication channels, such as by using text messaging, video conferencing, on-line meetings, etc. These communications may involve the subject matter of a meeting or appointment that a user may wish to attend.

Some current systems also provide a feature within an electronic mail system that can be actuated by the user to schedule a meeting. For instance, a user can drag an electronic mail message onto a representation of the user's calendar, in order to generate an appointment or meeting on the user's calendar.

The discussion above is merely provided for general background information and is not intended to be used as an aid in determining the scope of the claimed subject matter.

SUMMARY

An electronic mail (email) system generates an email user interface display, that allows the user to enter message content. A context-sensitive calendar preview can be triggered and displayed on the email user interface display. The email system detects a user drag and drop input dragging at least a portion of the message content onto the calendar preview, and automatically generates a calendar event based upon the detected drag and drop input, and the particular portion of the message content dragged onto the context-sensitive calendar preview.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
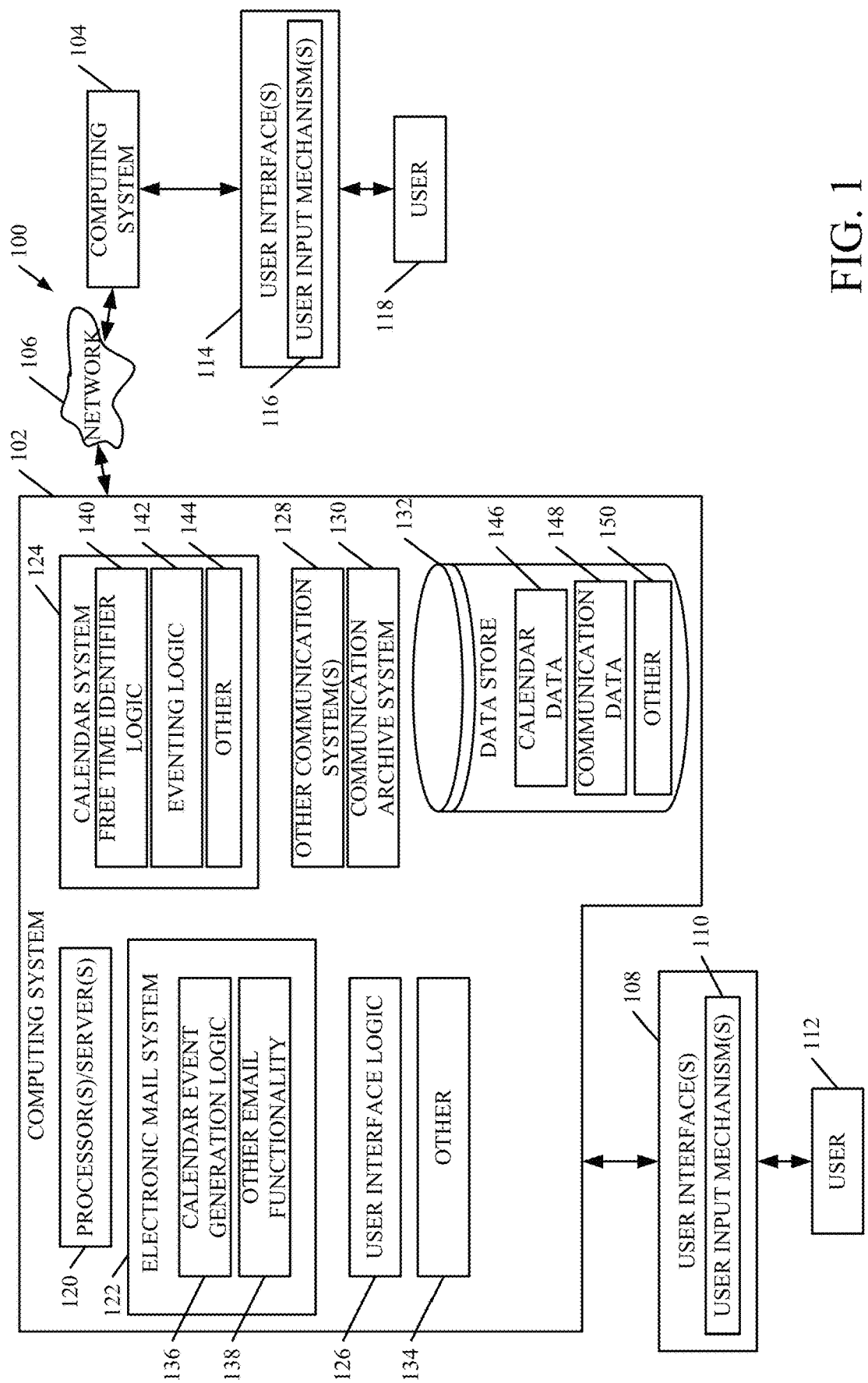
FIG. 1 is a block diagram of one example of a computing system architecture.

FIG. 1 is a block diagram of one example of a computing system architecture 100. Architecture 100 is shown with computing systems 102 and 104 in communication with one another over network 106. It will be noted that, while FIG. 1 shows only two computing systems 102 and 104 in communication with one another, there can be additional communication systems as well. The two are shown for the sake of example only.

Computing system 102 illustratively generates user interfaces 108 with user input mechanisms 110, for interaction by user 112. User 112 illustratively interacts with user input mechanisms 110 in order to control and manipulate computing system 102. Similarly, computing system 104 is shown generating user interfaces 114 with user input mechanisms 116 for interaction by user 118. User 118 illustratively interacts with user input mechanisms 116 in order to control and manipulate computing system 104.

Network 106 can be any of a wide variety of different kinds of networks. It can be a wide area network, a local area network, a cellular network, a near field communication network or another network or a combination of networks, Computing system 102 illustratively includes processors or servers 120, electronic mail (email) system 122, calendar system 124, user interface logic 126, other communication systems 128, communication archive system 130, data store 132, and it can include a wide variety of other items or functionality 134. Electronic mail system 122, itself, illustratively includes calendar event generation logic 136 and a wide variety of other email functionality 138. Calendar system 124, itself, illustratively includes free time identifier logic 140, eventing logic 142, and it can include a wide variety of other calendar system functionality 144. Data store 132, itself, illustratively includes calendar data 146, communication data 148, and it can include a wide variety of other information 150.

It will also be noted that computing systems 102 and 104 can be similar systems. However, they can be different as well. For the purposes of the present description, it will be assumed that they are similar systems, and the description will proceed under that assumption. That is made for the sake of example only, and the two systems can be different as well.

Before describing the overall operation of architecture 100 in more detail, a brief overview of some of the items in architecture 100, and their operation, will first be provided. User interface logic 126 in computing system 102 illustratively receives inputs from other items in computing system 102 and generates user interfaces 108 and also detects user inputs through mechanisms 110. Email system 122 illusively allows user 112 to compose, send, and receive electronic mail messages and attachments and perform other email functions, such as arrange folders, etc. Calendar system 124 illustratively allows user 112 to schedule appointments, generate meeting requests, respond to meeting requests, identify free timeslots of various users, and perform other scheduling and calendar functions. Calendar event generation logic 136 illustratively allows user 112 to automatically generate a calendar event, within calendar system 124, from a user interface display generated by email system 122. In doing so, it can access free time identifier logic 140 to identify free timeslots for recipients of a message being composed. It also allows the user to drag a portion of an email message onto a calendar preview. Logic 136 then interacts with eventing logic 142 in calendar system 124 in order to generate a calendar event.

Other communication systems 128 can include a wide variety of systems that allow users to communication with one another. For instance, they can include a text messaging system, an on-line meeting system, a video conferencing system, cellular or other telephone network communication systems, a near field communication system, or a wide variety of other systems.

Communication archive system 130 illustratively archives various communications made by user 112 using email system 122 or any other of the communication systems 128. It illustratively includes natural language understanding or natural language processing systems that generate an understanding of the subject matter content of the communications. For instance, it can use speech recognition or other mechanisms to transcribe an on-line meeting, or a cellular telephone call, etc. and generate the understanding based on the transcript. It can then generate an index of the communications, based on subject matter, based upon the author of the communication, based upon recipients or attendees or, based on the date of the communication, or based on other indexing criteria. It can then store the content of the communication, along with an index of it, as communication data 148 in data store 132. In one example, communication archive system 130 also illustratively includes a search component that allows other components of computing system 102 or architecture 100 to access data store 132 and search for communications, based upon any of the indexing criteria used to index that communication data.

Figure 2:
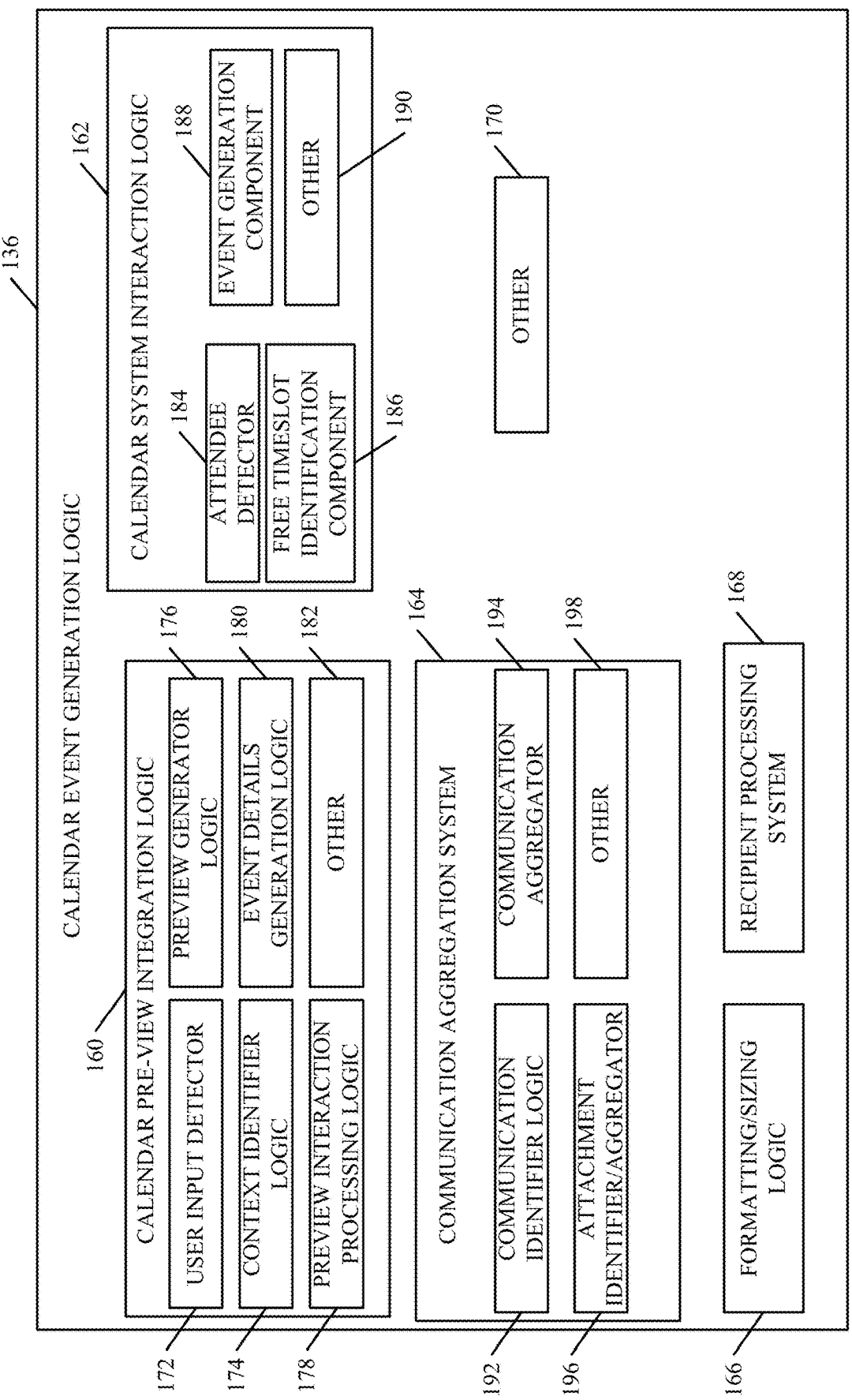
FIG. 2 is a block diagram of one example of calendar event generation logic in more detail.

FIG. 2 is a block diagram of one example of calendar event generation logic 136, in more detail. In the example shown in FIG. 2, logic 136 illustratively includes calendar preview integration logic 160, calendar system interaction logic 162, communication aggregation system 164, formatting/sizing logic 166, recipient processing system 168, and it can include a wide variety of other logic 170. Calendar preview integration logic 160 illustratively includes input detector 172, context identifier logic 174, preview generator logic 176, preview interaction processing logic 178, event details generator logic 180, and it can include a wide variety of other items 182. Calendar system interaction logic 162 illustratively includes a attendee detector 184, free timeslot identification component 186, event generation component 188, and it can include other items 190. Communication aggregation system 164 illustratively includes communication identifier logic 192, communication aggregator 194, attachment identifier/aggregator 196, and it can include other items 198. Again, before describing the operation of architecture 100 (shown in FIG. 1) and calendar event generation logic 136 (shown in FIG. 2) in more detail, a brief overview of some of the items in logic 136 and their operation, will first be provided.

User input detector 172 illustratively detects a user input indicating that the functionality of calendar event generation logic 136 should be activated or triggered. Context identifier logic 174 can identify the context or content of a message being displayed or composed by email system 122 to determine that the functionality of logic 136 should be activated or triggered as well. It can also illustratively identify a relevant date range for which the user may wish to schedule a meeting, appointment, or other calendar event. Preview generator logic 176 then generates a calendar preview indicative of the user's calendar over the relevant date range. It can, in addition, generate a preview of free timeslots that are available for the user, or for the user and any recipients of the message or calendar event being composed or viewed. Preview interaction processing logic 178 illustratively detects user interactions with the calendar preview, such as the user dragging a portion of the email content onto the calendar preview, or other interactions. Event details generator logic 180 illustratively generates a user interface, with user input mechanisms, that allow the user 112 to add details about a calendar event that is to be generated.

Attendee detector 184 in calendar system interaction logic 162 illustratively detects any recipients or attendees of the calendar event to be generated. Free timeslot identification component 186 identifies free timeslots in the calendars of those attendees or recipients and provides them to preview generator logic 176 so that they can be displayed on the calendar preview generated in the email display of user 112. Free timeslot identification component 186 illustratively does this by interacting with free time identifier logic 140 in calendar system 124. Event generation component 188 illustratively interacts with eventing logic 142 in calendar system 124 to generate a calendar event in calendar system 124 (and possibly in the calendar systems of other users 118 in architecture 100 who are to receive the email or calendar event).

Communication identifier logic 192 in communication aggregation system 164 illustratively interacts with communication archive system 130 to identify any communication data 148 that may be relevant to the calendar event being generated. For instance, if user 112 has had other communications (such as other emails, text messages, phone calls, on-line meetings, etc.) that are related to the content of the calendar event being generated, then communication identifier logic 192 illustratively searches for, and identifies, that communication data 148, using communication archive system 130. Communication aggregator 194 then aggregates all of the identified communications and either loads the content of those identified communications into the calendar event (such as into a notes or description portion of the calendar event), or it attaches a link to those communications, or it otherwise identifies those communications as corresponding to the calendar event. Attachment identifier/aggregator 196 also identifies any attachments to the related communications and aggregates those into the calendar events (such as bodily, by using links, etc.).

Formatting/sizing logic 166 illustratively formats and sizes a description of the calendar event so that it fits into an electronic mail message and so that it can be sent to recipients. This can involve changing font, size, layout, and a wide variety of other formatting and sizing functions.

Recipient processing system 168 illustratively identifies when user 112 receives a calendar event or an email message that includes a calendar event, generated using calendar event generation logic 136. It illustratively generates a user interface with user input mechanisms that allow the recipient to process the calendar event (such as accept it, reject it, propose new times, etc.) or email message (such as to incorporate other free timeslots into a responsive message, to generate a response indicating that the user accepts the calendar event, etc.).

Figure 3:
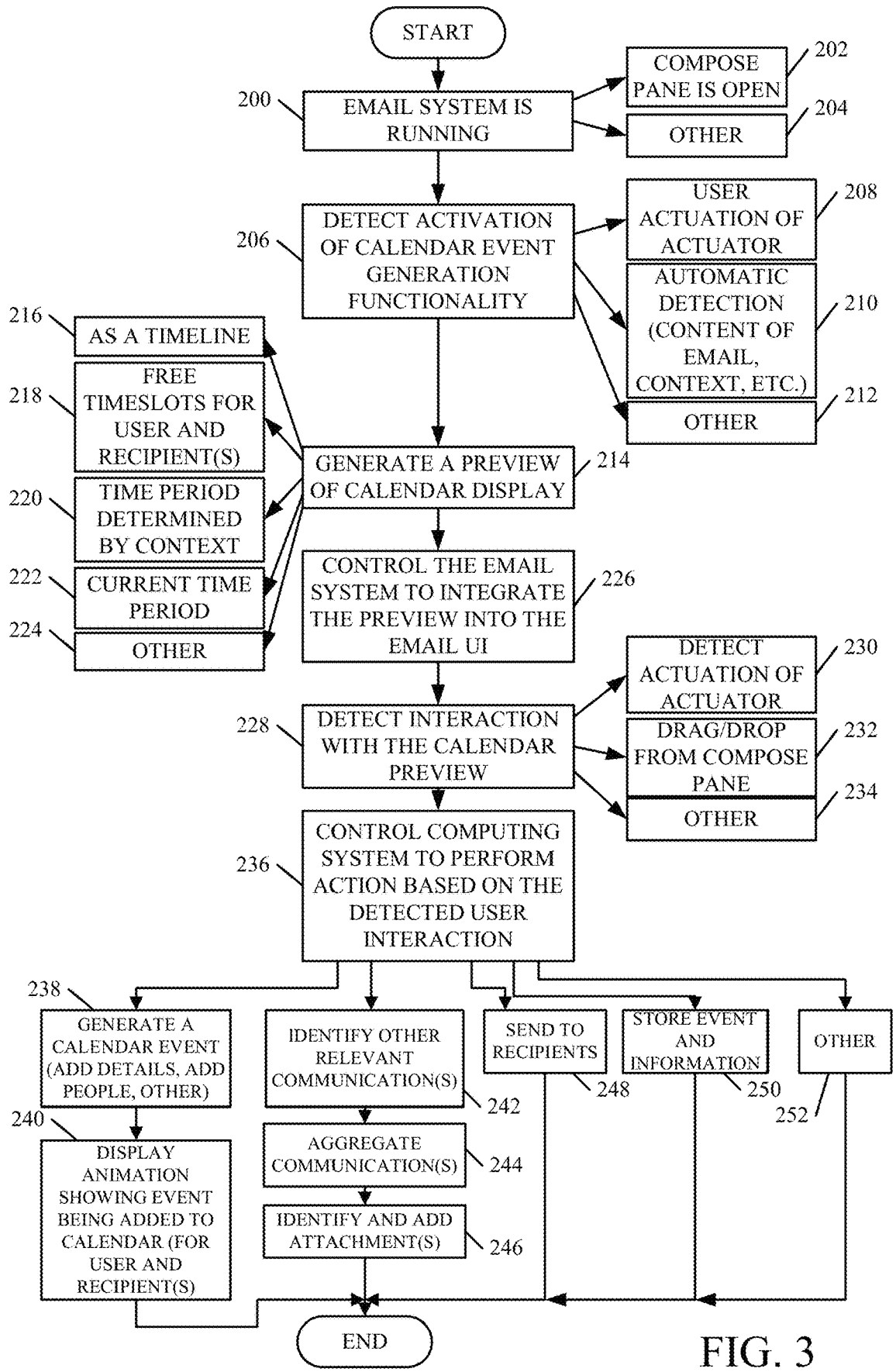
FIG. 3 is a flow diagram illustrating one example of the operation of the architecture shown in FIG. 1, and the calendar event generation logic shown in FIG. 2, in allowing a user to generate a calendar event from the email display.

FIG. 3 is a flow diagram illustrating one example of the operation of architecture 100, and calendar event generation logic 136, in allowing user 112 to generate a calendar event from within an email display generated by email system 122, and using calendar event generation logic 136.

It is first assumed that user 112 has email system open and running on computing system 102. This is indicated by block 200 in FIG. 3. In one example, user 112 also has the compose pane open on the email user interface, so that the user can author or otherwise compose an email message by entering message content onto the compose pane. This can be done using the keyboard, a keypad, a virtual keyboard, etc. Having the compose pane open on the email user interface display is indicated by block 202. The email can be open and generating a display in other ways as well, and this is indicated by block 204.

Calendar preview generation logic 160 then detects a calendar event context that activates of calendar event generation functionality in logic 136. This is indicated by block 206. In one example, the calendar user interface display has an event generation actuator that can be actuated by user 112 in order to active the functionality of logic 136. Detecting actuation of the actuator is indicated by block 208. In another example, context identifier logic 174 illustratively analyzes the context or content of the message being composed or being displayed and determines that the calendar event generation logic 136 should be activated based upon that context, or content. For instance, in one example, logic 174 identifies other applications that user 112 has open, identifies the history of inputs or operations performed by user 112 on computing system 102, or identifies other context information and determines that the user may wish to generate a calendar event. In another example, context identifier logic 174 illustratively has natural language understanding or natural language processing components (or has access to them) and generates an understanding of the content in the email message being authored or displayed. The content may indicate that the user wishes to generate a calendar event.

For instance, if the displayed message includes a text string such as "We should set up a meeting to discuss ACME Corp." This may be detected by context identifier logic 174 as a text string that indicates that user 112 may wish to generate a calendar event from within email system 122. Thus, this may serve to actuate the functionality of calendar event generation logic 136.

Automatic detection and activation of that functionality is indicated by block 210. The calendar event generation functionality can be activated in other way as well, and this is indicated by block 212.

In response, preview generator logic 176 generates a preview display of the user's calendar. In doing so, it can access calendar data 146 for user 112 and generate a preview display based on that information. This is indicated by block 214. In one example, and as will be described in greater detail below, the preview representation of the user's calendar may be a timeline that shows various calendar times or dates in a strip of timeline information displayed on the email user interface display. Displaying the calendar preview as a timeline is indicated by block 216 in FIG. 3. In another example, attendee detector 184 may detect the attendees of the calendar event, such as the recipients of the email message being displayed or other attendees, and free timeslot identification component 186 can identify free timeslots when all of the potential attendees, as well as user 112, are free for the calendar event. These free timeslots may be displayed as the calendar preview display. Identifying the free timeslots for the user 112 and recipients of the calendar event is indicated by block 218.

Also, in one example, context identifier logic 174 may identify a relevant time period based upon the content of the email message being displayed. For instance, the email message being displayed may indicate a future time period or it may indicate a current time period, or it may otherwise indicate a relevant time period. In that case, this is provided to preview generator logic 176 which generates the calendar preview for that relevant time period. Having the relevant time period for which the calendar preview is displayed determined based on the contexts of the message being displayed is indicated by block 220 in the flow diagram of FIG. 3.

It will also be noted that the relevant time period may default to the current time period, or the calendar preview can be generated in other ways. This is indicated by blocks 222 and 224 in the flow diagram of FIG. 3.

Preview generator logic 176 then uses formatting/sizing logic 166 and controls email system 122 and user interface logic 126 in order to integrate the calendar preview display into the email user interface display so that it can be displayed to user 112 on the email user interface display. This is indicated by block 226. Some examples of this are described below with respect to FIGS. 4A-4C.

Preview interaction processing logic 178 then detects user interaction with the calendar preview displayed on the email user interface display. This is indicated by block 228. In one example, the email user interface display has an actuator that can be actuated by user 112 in order to generate a calendar event from within email system 122. Thus, preview interaction processing logic 178 can detect user actuation of that actuator. One example of this is described in greater detail below, and this is indicated by block 230 in the flow diagram of FIG. 3. In another example, user 112 may drag the email message being displayed (or a portion of that email message) from the compose pane onto the calendar preview display. This interaction is detected by preview interaction processing logic 178, and this is indicated by block 232. User 112 may interact with the calendar preview display in a wide variety of other ways as well, and this is indicated by block 234.

Preview interaction processing logic 178 then controls computing system 102 in order to perform one or more actions based upon the detected user interaction. This is indicated by block 236. In one example, for instance, where user 112 drags an email message, or a portion of an email message, onto a portion of the calendar preview, logic 178 controls computing system 102 to generate a calendar event. This is indicated by block 238 in the flow diagram of FIG. 3. For instance, it may first control event details generator logic 180 in order to generate a user interface display with user input mechanisms that allow user 112 to add details about the calendar event. One example of this is also described in greater detail below. It may also control format/sizing logic 166 and user interface logic 126 in order to generate an animation showing the event being added to the user's calendar (both for the user and other recipients of the calendar event). This is indicated by block 240 in the flow diagram of FIG. 3.

In another example, generation of the calendar event causes preview interaction processing logic 178 to control communication aggregation system 164 to identify other relevant communications, that are relevant to the calendar event, and to aggregate those communications so that they can be presented to user 112 and/or other recipients of the calendar event. Thus, communication identifier logic 192 searches for and identifies any other relevant communications in communication data 148, using communication archive system 130. This is indicated by block 242 in the flow diagram of FIG. 3. For instance, it may identify a subject matter content of the calendar event being generated, its invitees or attendees or recipients, etc. and use that information to search for other related communications in communication data 148.

Communication aggregator 194 then illustratively aggregates all of the relevant communications that were identified by identifier logic 192, so that they can be presented to user 112 or other recipients of the calendar event. This is indicated by block 244. In one example, for instance, one or more links to the relevant communications are generated and included in the calendar event or email system that is used to disseminate the calendar event. In another example, the body of those communications or other information from those communications is copied into the calendar event (such as in a notes or description portion of the calendar event or elsewhere). The links can also accompany that content.

In addition, attachment identifier/aggregator 196 also identifies relevant attachments and aggregates them into the calendar event as well. This is indicated by block 246. Again, the attachments can be those that were attached to the relevant communications identified by identifier 192 and they can be attached to the calendar event, links to those attachments can be included in the calendar event, or the content of the attachments can be included as well. All of these are contemplated herein.

At some point, user 112 will wish to disseminate the calendar event to all invitees, attendees or recipients. For instance, the user may actuate a send actuator to send an email message containing the calendar event. In another example, the user may actuate another actuator to generate the calendar event in his or her own calendar and in the calendars of the other recipients. Sending the calendar event to the recipients is indicated by block 248. Event generation component 188 can be used to interact with eventing logic 142 in calendar system 124 for user 112 and in the calendars for the other recipients of the calendar event in order to automatically generate the calendar event within those calendar systems.

The calendar system 124 will then illustratively store the calendar event as calendar data 146 for user 112. In addition, communication archive system 130 will illustratively store the calendar event as communication data 148, and index it appropriately, as discussed above. Storing the calendar event and corresponding information is indicated by block 250 in the flow diagram of FIG. 3. The computing system 102 can be controlled based on user interactions in other ways as well, and this is indicated by block 252.

Figure 4A:
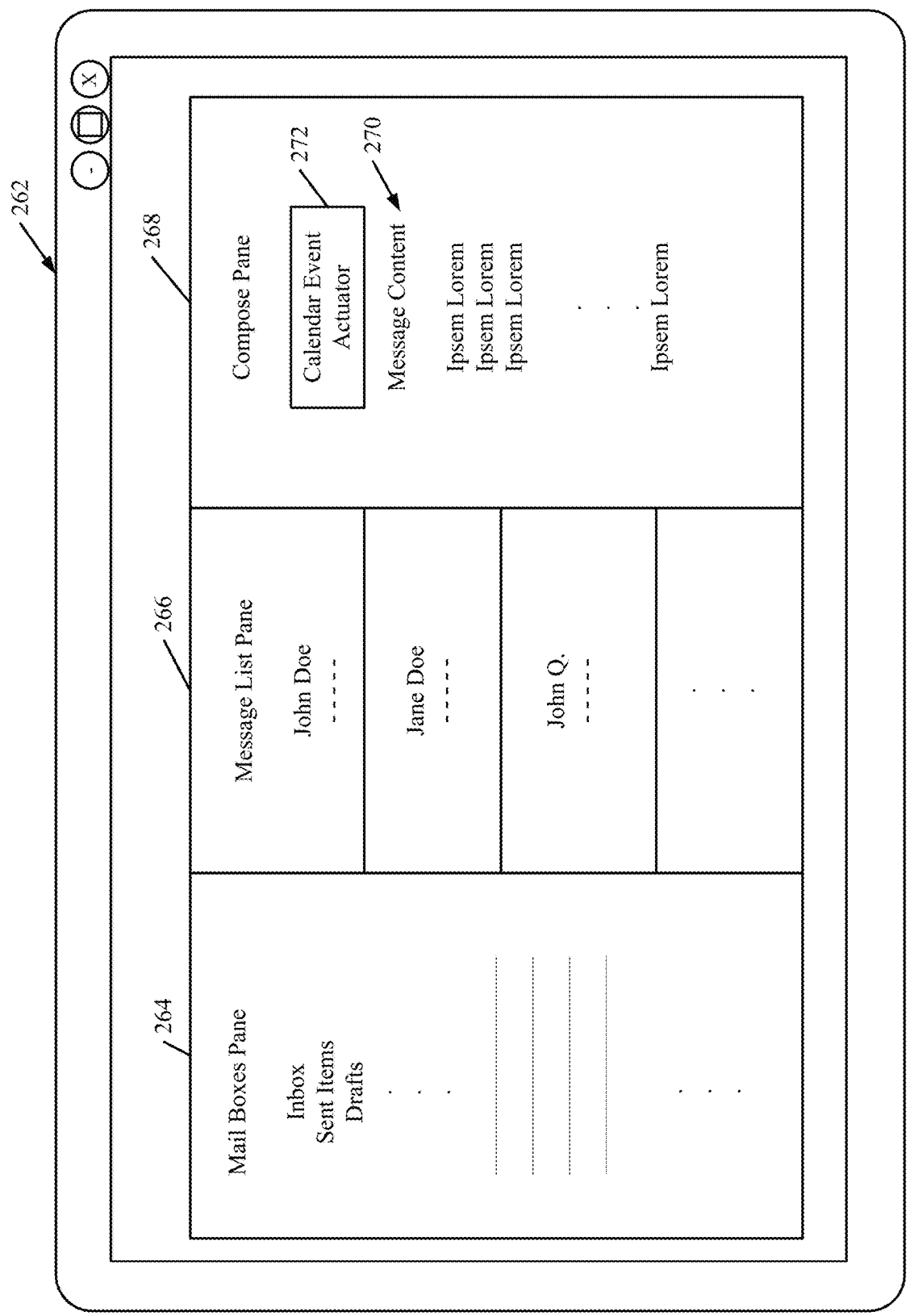
FIGS. 4A-4C show examples of user interface displays.
Figure 4B:
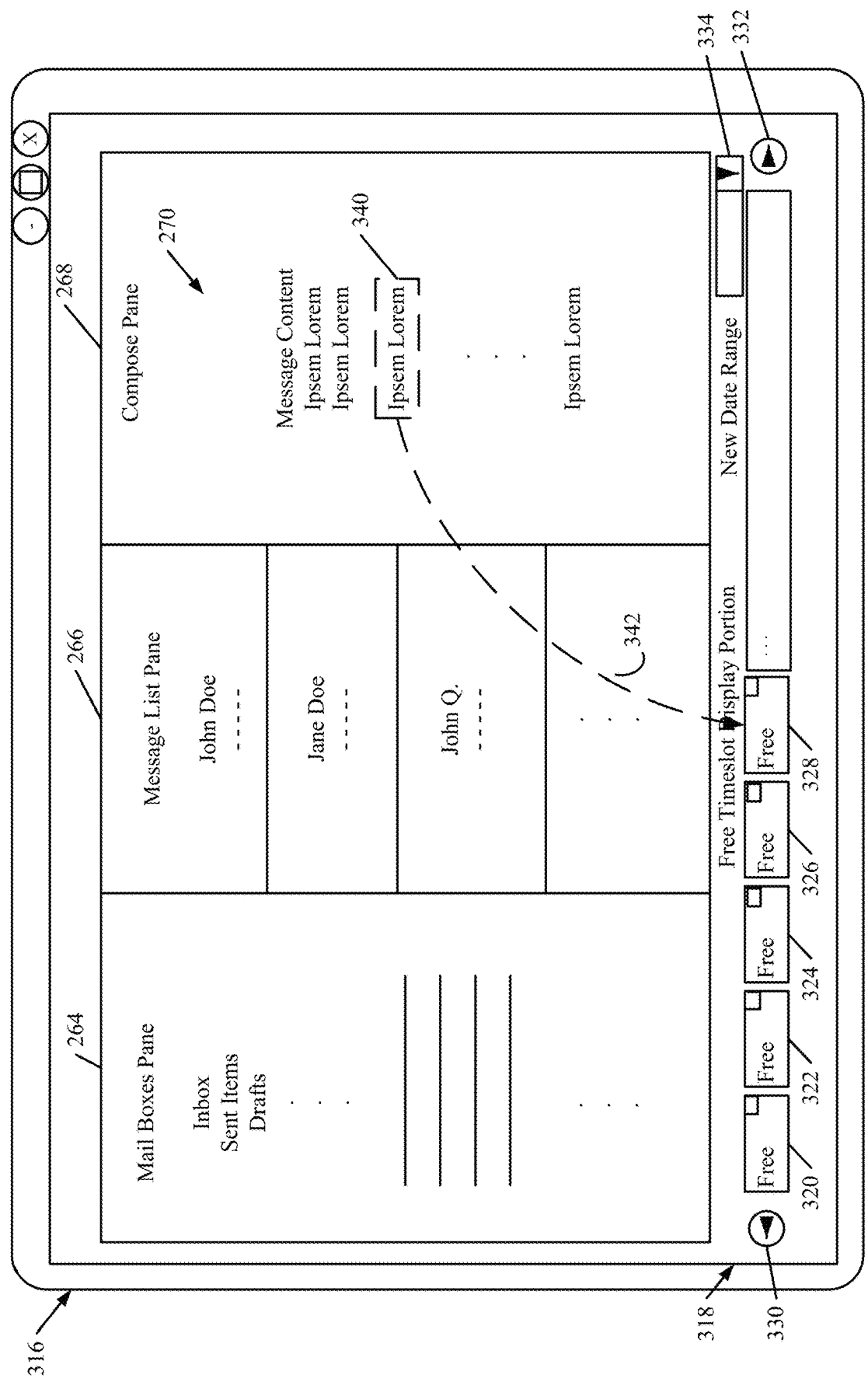
Figure 4C:
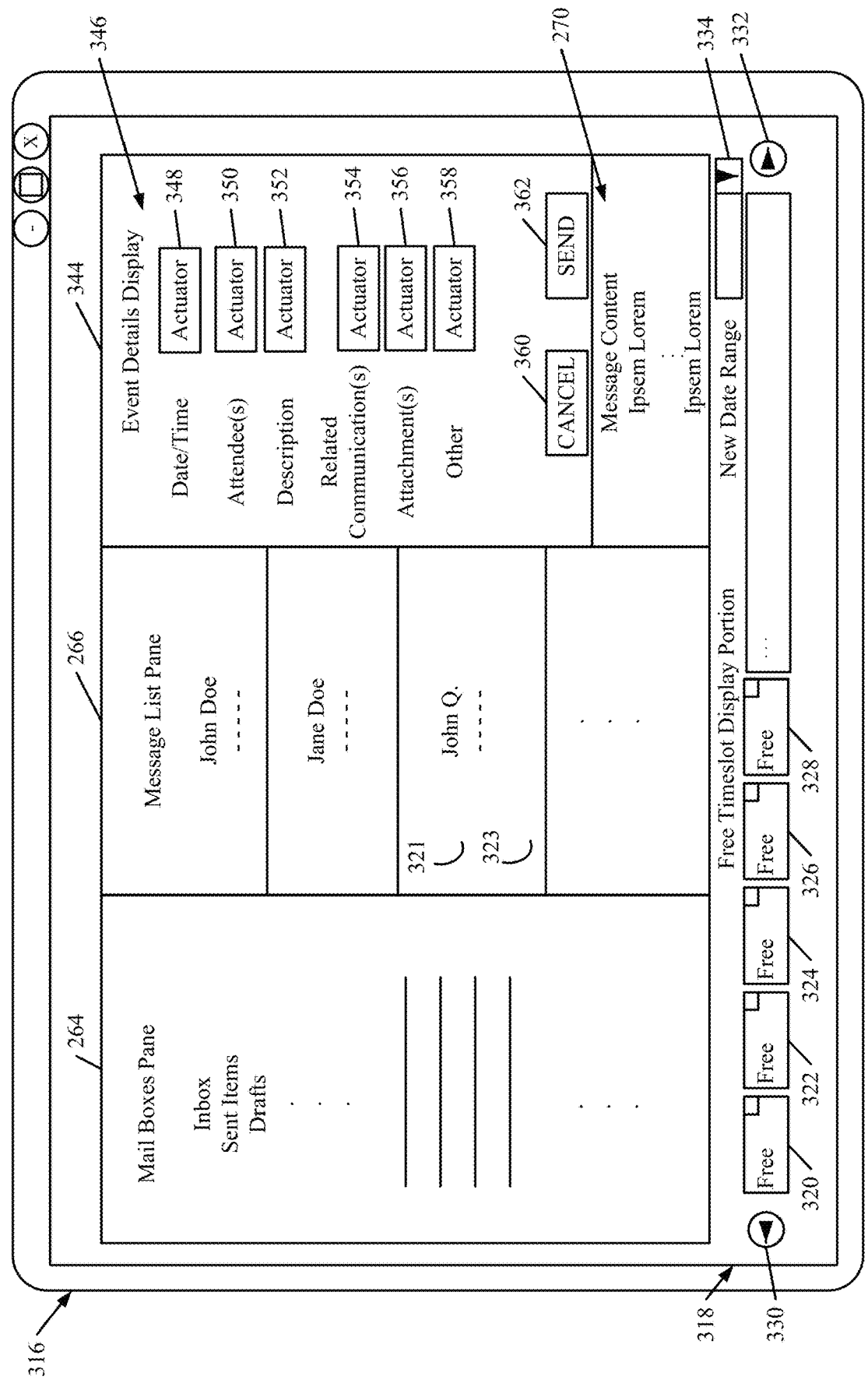

FIGS. 4A-4C show examples of a variety of different user interface displays that can be generated. FIG. 4A shows one example of a user interface display 262 that can be generated by email system 122. It can be seen that user interface display 262 includes a mailboxes pane 164 that displays the various mailboxes in the user's email system. It includes a message list pane 266 that includes a list of messages, and it also includes a compose pane 268 in which user 116 can compose message content 270. Compose actuators (such as a keyboard) can be used to input content 270 into the email message.

User interface display 262 also illustratively includes a calendar event actuator 272. When user 112 actuates calendar event actuator 272, the functionality of calendar event generation logic 136 is activated. In one example, actuator 272 is always displayed when the compose pane 268 is displayed by email system 122. In another example, actuator 272 is only displayed in certain contexts, when message content 270 contains certain content items, or in other circumstances.

Once the functionality of calendar event generation logic 136 is activated, preview generator logic 176 illustratively generates the calendar preview display. In one example, it accesses free timeslot identification component 186 to identify free timeslots for user 112 and any other recipients of the calendar event that is to be generated (such as the recipients of the email message being composed on pane 268, or otherwise). In doing so, it can interact with free time identifier logic 140 in calendar system 124 and in any other calendar systems for other users that are to receive the calendar event.

In one example, for instance, the free time identifier logic 140 in calendar system 124 exposes an application programming interface (or API) that can be consumed by free timeslot identification component 186 in calendar event generation logic 136. The API can be used to obtain free timeslots in the user's calendar and in the calendars of other recipients. The calendar system 124 can expose APIs to perform other calendar system functionality as well. In one example, the current date can be used as an anchor for identifying free timeslots. For instance, the timeslots may be obtained for a week, beginning at a current date and time and extending one week into the future. They can also be obtained for a month, or for other periods of time. In addition, where context identifier logic 174 has identified another relevant time period, the free timeslots for the user and other recipients of the calendar event can be identified for that time period as well.

FIG. 4B is a diagram of another example of a user interface display 316 that can be generated by email system 122 and calendar event generation logic 136. Some of the items are similar to those shown in FIG. 4A, and they are similarly numbered. Thus, it can be seen that user interface display 316 includes mailboxes pane 264, a message list pane 266 and message content 270 that is displayed in compose pane 268. However, FIG. 4B also shows that preview generator logic 176 has now also generated the calendar preview display portion 318 on user interface display 316. Portion 318 illustratively includes a set of user selectable display elements 320, 322, 324, 326, and 328. Each of the display elements 320-328 can be selected by user 112, such as by dragging and dropping an item of content from the email message content 270 onto one of the elements 320-328. Portion 318 also illustratively include scroll actuators 330 and 332 that can be actuated to move forward and backward in time to identify other time slots that the user may have in his or her calendar, and that the recipients of the calendar event may also have in their calendars. Similarly, a new date range actuator 334 can be used to identify a different date range for which timeslots are to be displayed.

FIG. 4B also shows that the user has selected a portion 340 of the message content 270 in compose pane 268 and has dragged it from compose pane 268 onto the timeslot represented by display element 328. This is indicated by the dashed arrow 342. Alternatively, of course, it may be that the user has selected and dragged the entire message from compose pane 268 to one of the display elements 320-328. This type of interaction is detected by preview interaction processing logic 178.

In response, event details generator logic 180 illustratively generates a user interface display with user input mechanisms that allow user 112 to provide details for a calendar event that will be generated in the user's calendar, and may be generated in the calendars of other recipients of the calendar event. FIG. 4C shows one example of this.

It can be seen in FIG. 4C that some of the items identified in FIG. 4C are similar to those shown in FIG. 4B, and they are similarly numbered. It can be seen in FIG. 4C, however, that event details generator logic 180 has now generated an event details user interface display 344 with a set of user input mechanisms illustrated generally at 346 that allow the user 112 to enter details about the calendar event.

For instance, user input mechanisms 346 illustratively includes a date/time actuator 348 that allows the user to enter or select a date and time for the calendar event. It will be noted that, in one example, this may be prepopulated from the information identifying the free timeslot and corresponding to user interface display element 328, on which the user dragged and dropped the message content.

User input mechanisms 346 may also illustratively include an attendees actuator 350 that can be actuated to add, delete, or modify attendees or recipients of the calendar event. In one example, the attendees may also be prepopulated as including the recipients of the email message being composed in compose pane 268.

User input mechanisms 346 may also illustratively include a description actuator 352. Actuator 352 can be used to add, delete or modify a description of the calendar event. It will also be noted that, in one example, the description may be prepopulated with the particular portion 340 of content 270 that was dragged onto display element 328.

User input mechanisms 346 may also include a related communications actuator 354 and an attachments actuator 356. These actuators illustratively allow the user to identify, add, modify or delete related communications and attachments that have been aggregated by communication aggregation system 164, and that have been identified as communications that relate to the calendar event being generated. For instance, actuation of actuators 354 and 356 may surface those communications and attachments for inclusion or exclusion by user 112. They may allow user 112 to search for other communications or attachments as well. User input mechanisms 346 may include a wide variety of other actuators 358 as well.

Also, in the example shown in FIG. 4C, the event details display 344 can include a cancel actuator 360 and a send actuator 362. Actuator 360 can be actuated by the user to cancel the event being generated, and send actuator 362 can be used to send it to other recipients. When the send actuator 362 is actuated calendar event generation logic 136 illustratively controls format/sizing logic 166 to incorporate an actuatable representation of the calendar event, into the email message, in-line with the other message content 270 so that it can easily be seen, in the context of the current conversation, by other recipients. It may illustratively include a calendaring actuator that can be actuated by a recipient in order to automatically add the calendar event to the recipient's calendar, simply by clicking on it, tapping it, or otherwise interacting with it. All of these and other interactions are contemplated herein.

It can thus be seen that the present description greatly enhances the operation of computing system 102. It illustratively allows a user to generate a calendar event from within email system 122, and without opening and navigating to a separate calendar system 124. This saves not only processing and computation overhead in rendering UI displays, but it also reduces bandwidth requirements, as the user need not navigate to a separate calendar system. In addition, the user need not conduct multiple searches to identify possible free times. Instead, they are surfaced for the user, without the need to perform that type of searching. In addition, the user need not perform multiple searches to find related communications among various other communication systems. Instead, by aggregating and archiving that information, and automatically surfacing it for the user, this saves bandwidth, processing overhead, and rendering overhead, that would otherwise be needed for the user to perform the various searches through the various communication systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
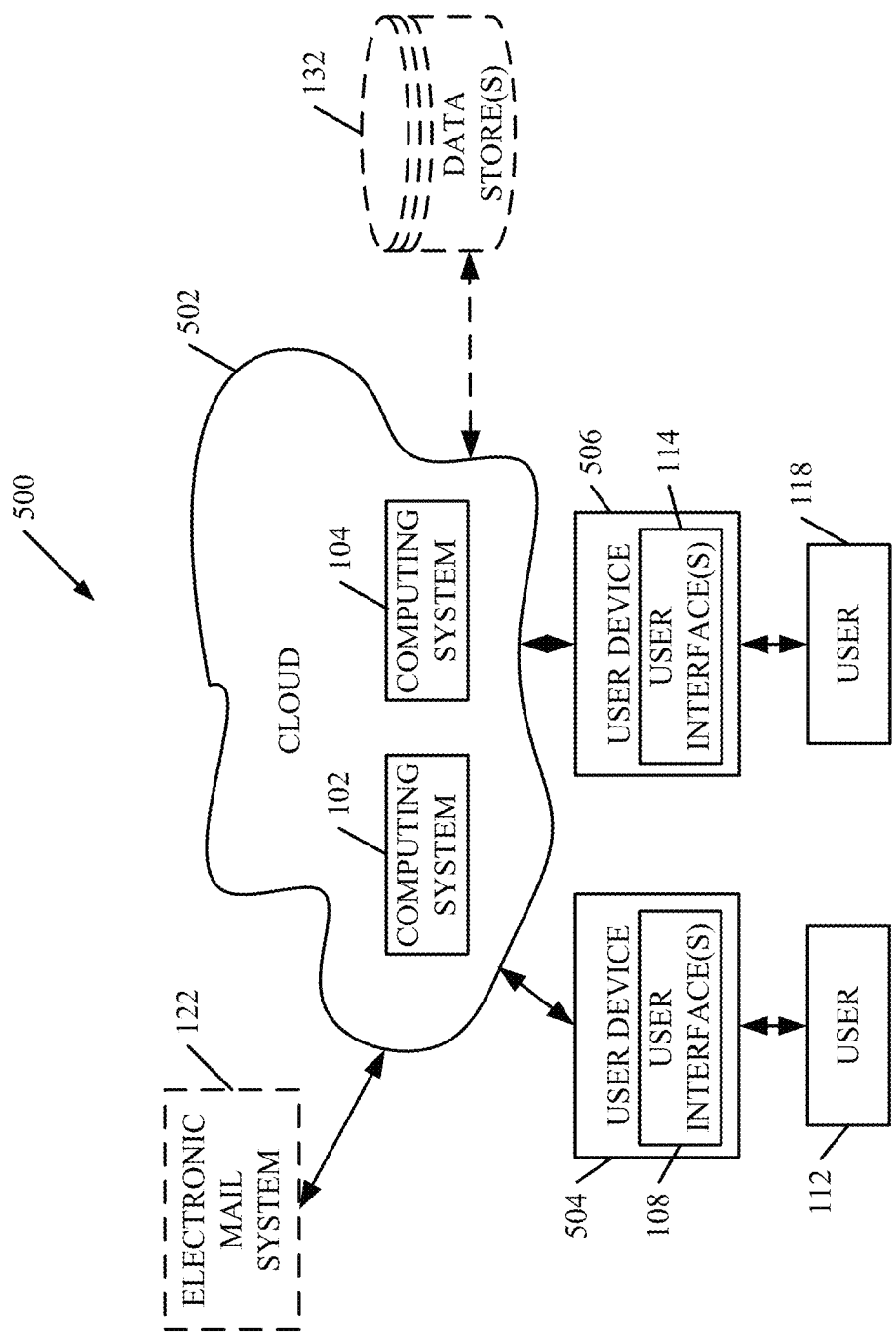
FIG. 5 is a block diagram showing the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing systems 102 and 104 can be located in cloud 502 (which can be public, private, or a combination where portions are public while others are private). Therefore, users 112 and 118 use user devices 504 and 506 to access those systems through cloud 502.

FIG. 5 also depicts another example of a cloud architecture. FIG. 5 shows that it is also contemplated that some elements of architecture 100 can be disposed in cloud 502 while others are not. By way of example, data store 132 can be disposed outside of cloud 502, and accessed through cloud 502. In another example, email system 122 can also be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
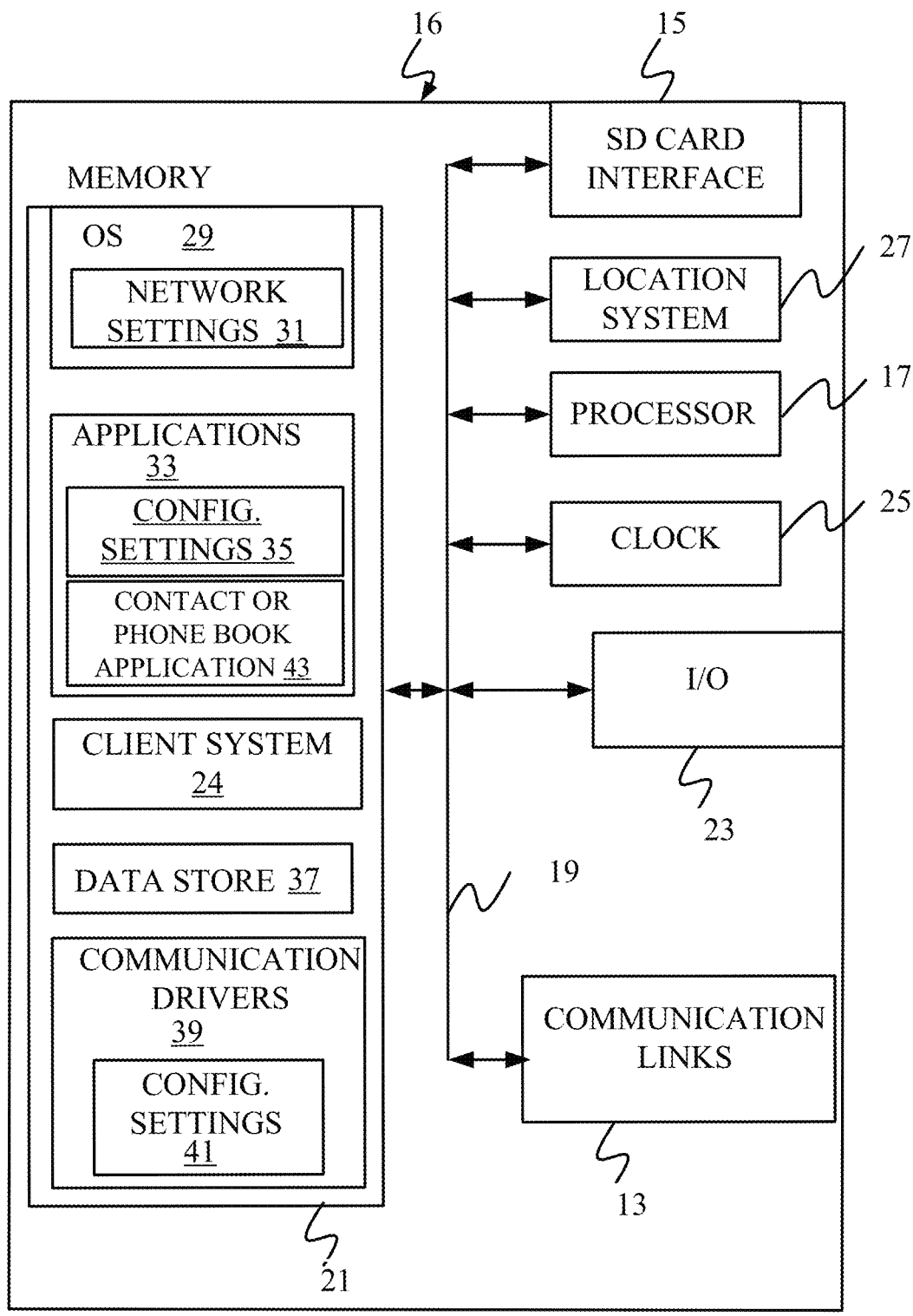
FIGS. 6-8 show examples of mobile devices that can be used in the architectures shown in the previous Figures.
Figure 7:
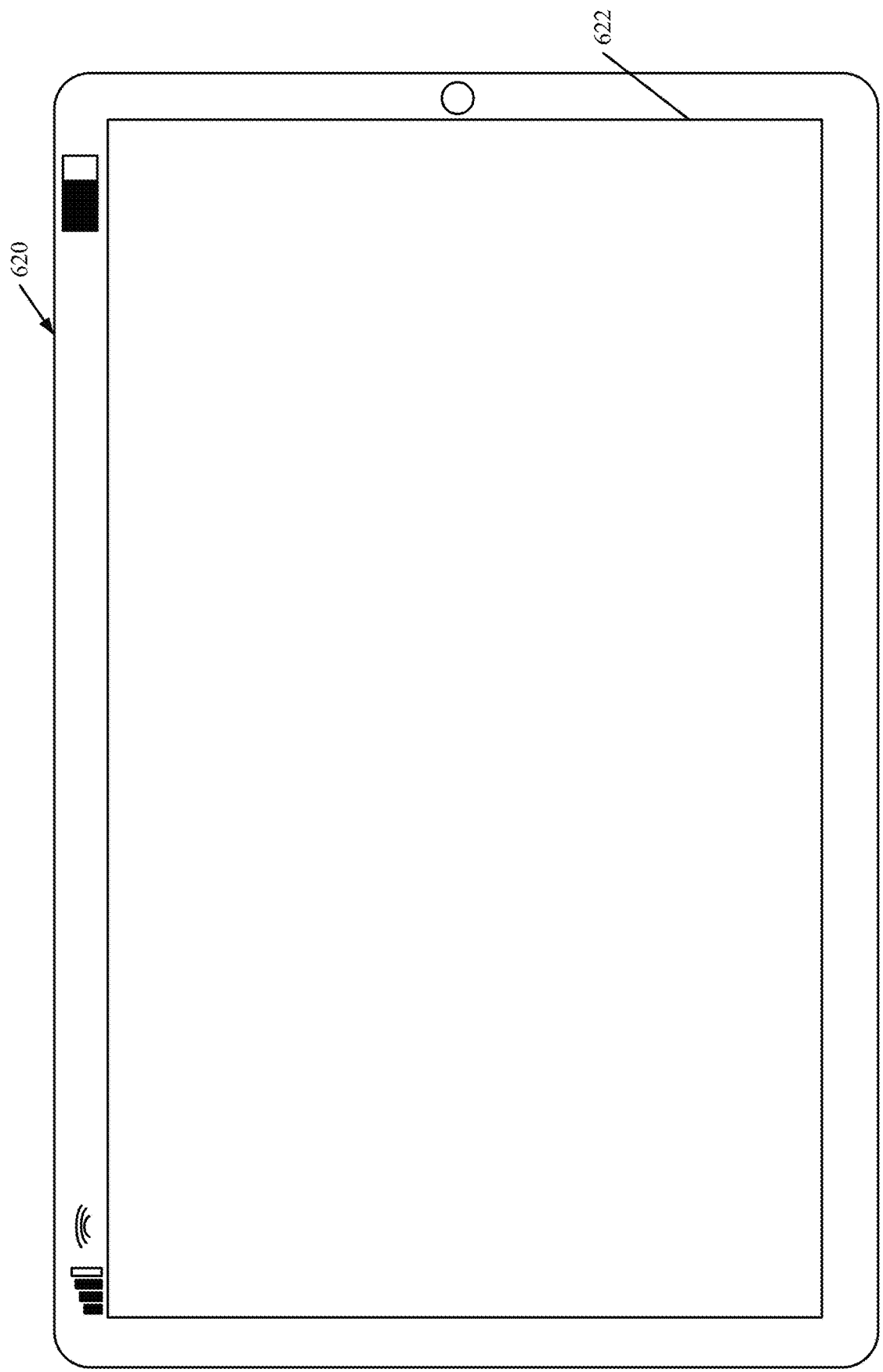
Figure 8:
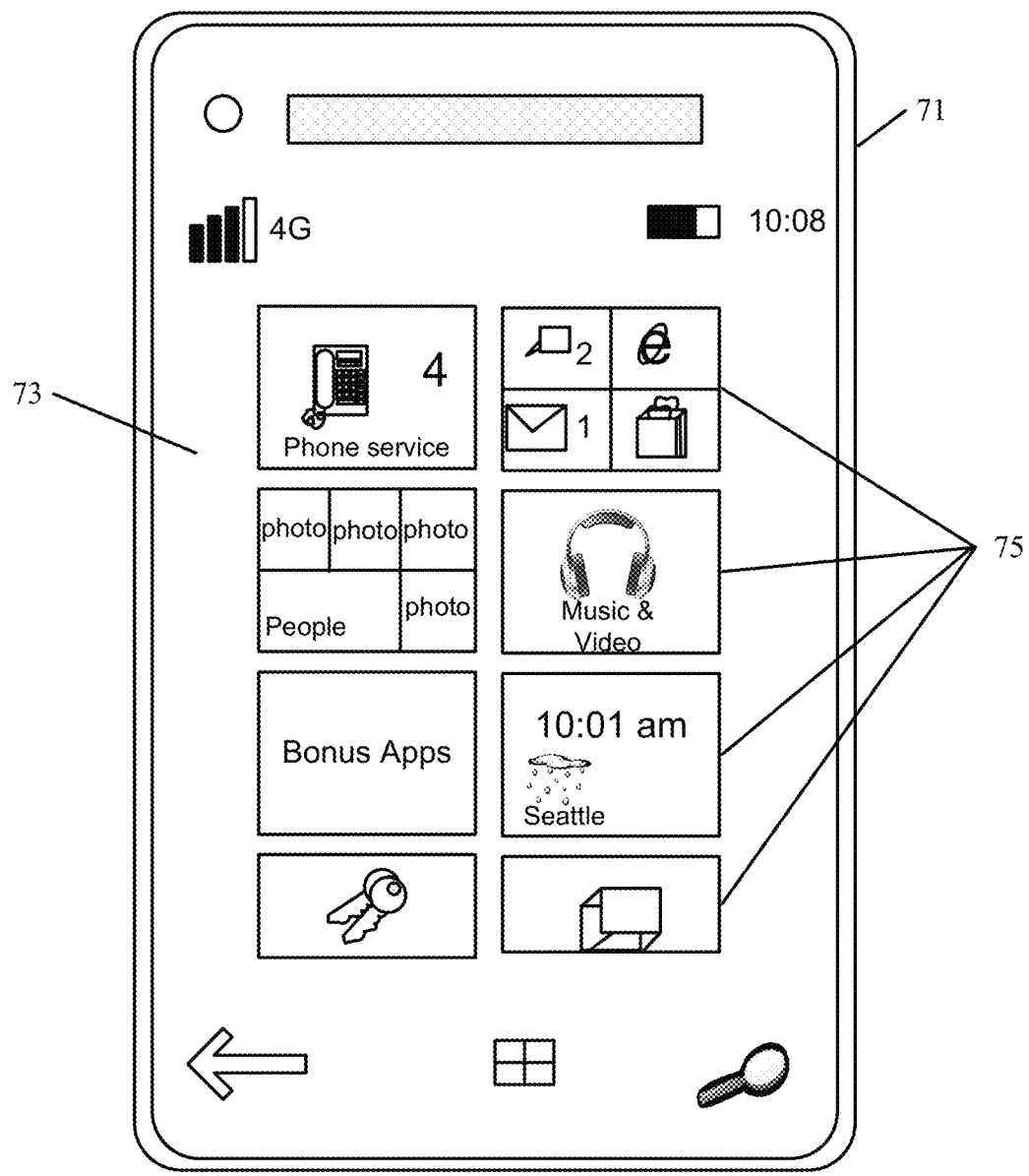

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 120 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
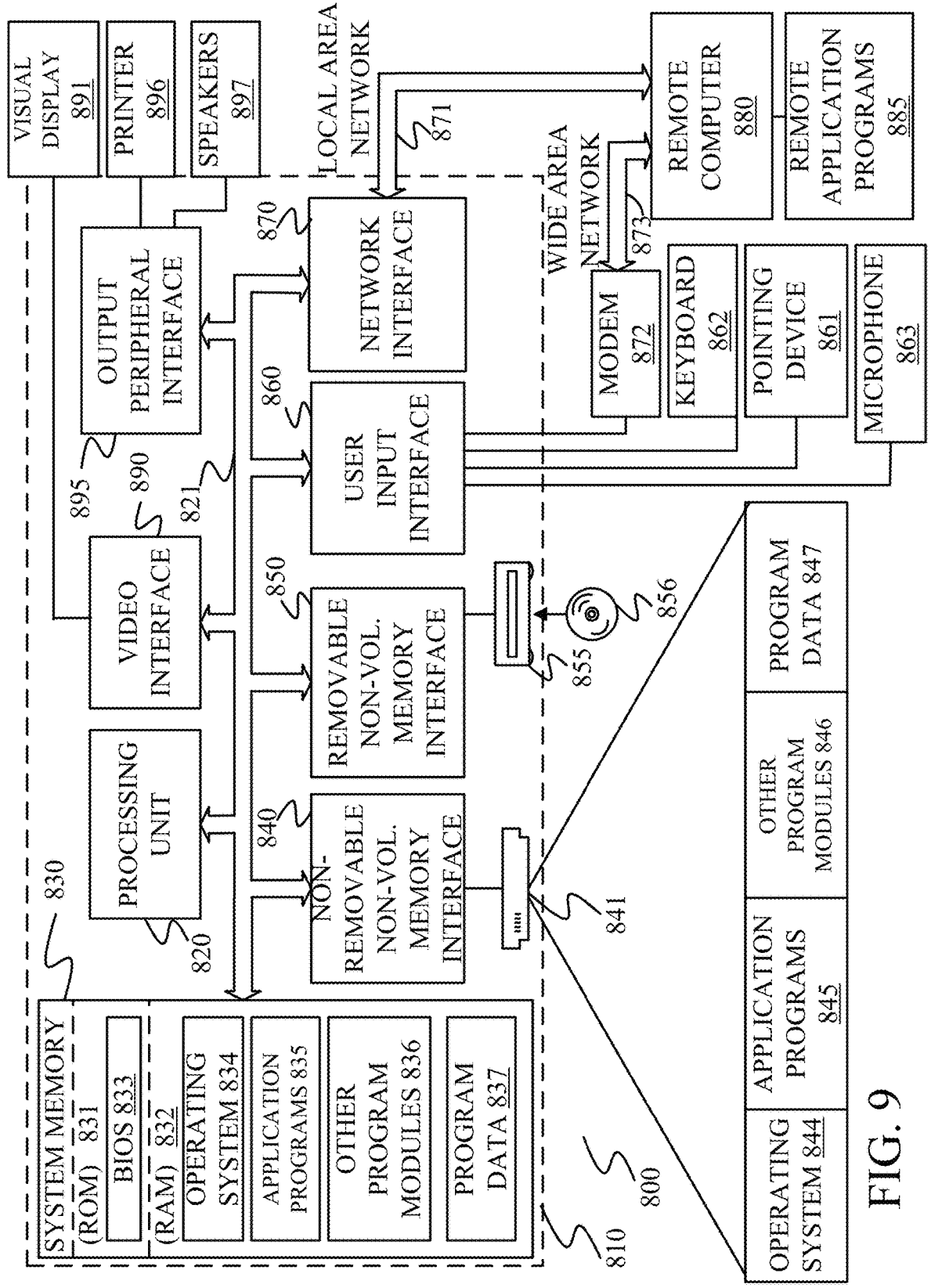
FIG. 9 is a block diagram of one example of a computing environment that can be used in the architectures shown in the previous Figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers 120), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:
an electronic mail (email) system that displays an email user interface display with a display pane displaying message content of an email message;
context identifier logic that identifies a calendar event context based on the message content;
calendar preview display generator logic that, based on identification of the calendar event context, displays a calendar preview portion with from a schedule of a user, on the email user interface display; and
preview interaction processing logic that detects a user interaction with the calendar preview portion and controls the email system to interact with a calendar system to generate a calendar event based on the user interaction, the calendar event including a corresponding event display indicative of the calendar event.

Example 2 is the computing system of any or all previous examples wherein the preview interaction processing logic is configured to detect a user event initiation interaction indicative of dragging a portion of the message content onto a portion of the calendar preview portion.

Example 3 is the computing system of any or all previous examples and further comprising:
a calendar system; and
an event generation component configured to interact with the calendar system to generate the calendar event in the calendar system based on detection of the event initiation interaction.

Example 4 is the computing system of any or all previous examples and further comprising:
event details generation logic that generates a details user input mechanism that is actuatable by the user to add event details to the event display corresponding to the calendar event.

Example 5 is the computing system of any or all previous examples and further comprising:
a communication aggregation system that identifies another communication related to the calendar event and surfaces an indication of the identified other communication on the event display corresponding to the calendar event.

Example 6 is the computing system of any or all previous examples and further comprising:
a communication archive system that indexes and stores communication data based on user communications over a plurality of different communication systems.

Example 7 is the computing system of any or all previous examples wherein the communication aggregation system comprises:
communication identifier logic that identifies a content of the calendar event and accesses the communication archive system to identify communication data indicative of a plurality of related communications, that occurred over a plurality of different communication systems, that are related to the content of the calendar event.

Example 8 is the computing system of any or all previous examples wherein the communication aggregation system comprises:
a communication aggregator that aggregates the related communications and provides an indication of the related communications in the event display corresponding to the calendar event.

Example 9 is the computing system of any or all previous examples wherein the event details generation logic is configured to generate a user interface mechanism to surface the related communications for user selection for inclusion in the event display corresponding to the calendar event.

Example 10 is the computing system of any or all previous examples wherein the communication identifier logic identifies a subject matter content of the calendar event and identifies the related communications based on the subject matter content of the calendar event.

Example 11 is the computing system of any or all previous examples wherein the communication identifier logic is configured to identify a set of people corresponding to the calendar event and identify the related communications based on the set of people.

Example 12 is the computing system of any or all previous examples wherein the communication aggregation system comprises:
an attachment identifier that identifies an attachment to any of the related communications and provides an indication of the identified attachment in the event display corresponding to the calendar event.

Example 13 is a computer implemented method, comprising:
displaying an electronic mail (email) user interface display, in an email system, with a display pane displaying message content of an email message;

identifying a calendar event context based on the message content;

generating a calendar preview display portion from a schedule of a user, on the email user interface display, based on identification of the calendar event context;

detecting a user interaction with the calendar preview portion; and controlling the email system to interact with a calendar system to generate a calendar event based on the user interaction, the calendar event including a corresponding event display indicative of the calendar event.

Example 14 is the computer implemented method of any or all previous examples wherein detecting a user interaction comprises:

detecting a user event initiation interaction indicative of dragging a portion of the message content onto a portion of the calendar preview portion and wherein controlling the email system comprises controlling the email system to interact with the calendar system to generate the calendar event in the calendar system based on detection of the event initiation interaction.

Example 15 is the computer implemented method of any or all previous examples and further comprising:

controlling the email system to generate a details user input mechanism that is actuatable by the user to add event details to the event display corresponding to the calendar event.

Example 16 is the computer implemented method of any or all previous examples and further comprising:

identifying another communication related to the calendar event; and surfacing an indication of the identified other communication on the event display corresponding to the calendar event.

Example 17 is the computer implemented method of any or all previous examples wherein identifying another communication comprises:

identifying a content of the calendar event; and accessing a communication archive system, that indexes and stores communication data based on user communications over a plurality of different communication systems, to identify communication data indicative of a plurality of related communications, that occurred over the plurality of different communication systems, that are related to the content of the calendar event.

Example 18 is the computer implemented method of any or all previous examples and further comprising:

aggregating the related communications;

generating a user interface mechanism to surface the related communications for user selection for inclusion in the event display corresponding to the calendar event; and providing an indication of the related communications in the event display corresponding to the calendar event.

Example 19 is a computing system, comprising:

an electronic mail (email) system that displays an email user interface display with a display pane displaying message content of an email message;

context identifier logic that identifies a calendar event context based on the message content;

calendar preview display generator logic that, based on identification of the calendar event context, displays a calendar preview portion with from a schedule of a user, on the email user interface display;

preview interaction processing logic that detects a user event initiation interaction indicative of dragging a portion of the message content onto a portion of the calendar preview portion and controls the email system to interact with a calendar system to generate a calendar event based on the user interaction, the calendar event including a corresponding event display indicative of the calendar event; and a communication aggregation system that identifies another communication related to the calendar event and surfaces an indication of the identified other communication on the event display corresponding to the calendar event.

Example 20 is the computing system of any or all previous examples wherein the communication aggregation system identifies a plurality of related communications, made over a plurality of different communication systems, related to a subject matter content of the calendar event and surfaces an indication of the identified plurality of related communications on the event display corresponding to the calendar event.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the at least one processor, wherein the instructions, when executed, configure the computing system to:
    display an email user interface display with a display pane displaying message content of an email message;
    identify, based on the message content, a calendar event context indicative of a particular time period;
    identify a plurality of time slots, from a schedule associated with a user, based on the particular time period;
    display a calendar preview portion, on the email user interface display, that includes a plurality of display elements identifying the plurality of time slots, each display element corresponding to one of the time slots and being actuatable to select the corresponding time slot;
    based on detected user actuation of a particular one of the display elements displayed in the calendar preview portion, select a particular one of the time slots corresponding to the particular display element;
    control the email system to interact with a calendar system to generate a calendar event based on the particular time slot; and
    display, on the email user interface display, an event display that corresponds to the calendar event and includes event details, and
    includes a details user input mechanism that is actuatable by the user to modify the event details in the calendar event.

2. The computing system of claim 1 wherein the instructions configure the computing system to:
identify the plurality of time slots as free timeslots on the schedule associated with the user.

3. The computing system of claim 1 wherein the instructions configure the computing system to:
detect a user event initiation interaction indicative of dragging a portion of the message content onto a portion of the calendar preview portion;
select the particular one of the time slots based on the user event initiation interaction; and instruct a calendar system to generate the calendar event in the calendar system based on detection of the event initiation interaction.

4. The computing system of claim 3 wherein the instructions configure the computing system to:
based on user actuation of the details user input mechanism, add event details to the event display corresponding to the calendar event.

5. The computing system of claim 4 wherein the instructions configure the computing system to:
identify another communication related to the calendar event and surface an indication of the identified other communication on the event display corresponding to the calendar event.

6. The computing system of claim 5 wherein the instructions configure the computing system to:
store communication data based on user communications over a plurality of different communication systems.

7. The computing system of claim 6 wherein the instructions configure the computing system to:
identify a content of the calendar event; and
access the communication archive system to identify communication data indicative of a plurality of related communications, that occurred over a plurality of different communication systems, that are related to the content of the calendar event.

8. The computing system of claim 7 wherein the instructions configure the computing system to:
aggregate the related communications; and
provide an indication of the related communications in the event display corresponding to the calendar event.

9. The computing system of claim 8 wherein the instructions configure the computing system to:
generate a related communications user interface mechanism that represents the related communications; and
based on user interaction with the related communications user interface mechanism, add one or more of the related communications to the event display corresponding to the calendar event.

10. The computing system of claim 7 wherein the instructions configure the computing system to:
identify a subject matter content of the calendar event;
identify a set of people corresponding to the calendar event; and
identify the related communications based on the subject matter content of the calendar event and the set of people.

11. The computing system of claim 1, wherein
the display pane comprises a compose pane with a user input mechanism actuatable to compose content in the email message,
the event display and compose pane are displayed on the email user interface display simultaneously, and
the instructions configure the computing system to receive, while the event display is displayed on the email user interface display, user actuation of the compose actuator that composes the message content, for the email message, in the compose pane.

12. A computer implemented method, comprising:
displaying an email user interface display with a compose pane having a user input mechanism actuatable by a user to compose message content in an email message;
identifying a calendar event context based on the message content;
receiving schedule information from a schedule associated with the user;
displaying a calendar preview display portion that represents a calendar preview on the email user interface display based on the calendar event context;
detecting a user interaction with the calendar preview portion;
controlling the email system to interact with a calendar system to generate a calendar event based on the user interaction;
displaying, on the email user interface display simultaneously with the compose pane, an event display indicative of the calendar event; and
receiving, while the event display is displayed on the email user interface display, user actuation of the compose actuator that composes the message content, for the email message, in the compose pane.

13. The computer implemented method of claim 12 wherein the user comprises a first user,
detecting a user interaction comprises detecting a user event initiation interaction indicative of dragging a portion of the message content onto a portion of the calendar preview portion, and
controlling the email system comprises:
controlling the email system to interact with the calendar system to generate the calendar event in the calendar system based on detection of the event initiation interaction.

14. The computer implemented method of claim 12 and further comprising:
controlling the email system to generate a details user input mechanism that is actuatable by the first user to add event details to the event display corresponding to the calendar event
wherein the user input mechanism is actuatable while the event display is displayed.

15. The computer implemented method of claim 14 and further comprising:
identifying another communication related to the calendar event; and
surfacing an indication of the identified other communication on the event display corresponding to the calendar event.

16. The computer implemented method of claim 15 wherein identifying another communication comprises:
identifying a content of the calendar event;
accessing a communication archive system, that indexes and stores communication data based on user communications over a plurality of different communication systems, to identify communication data indicative of a plurality of related communications, that occurred over the plurality of different communication systems, that are related to the content of the calendar event;
aggregating the related communications;
generating a user interface mechanism to surface the related communications for user selection for inclusion in the event display corresponding to the calendar event; and
providing an indication of the related communications in the event display.

17. The computer implemented method of claim 12, and further comprising:
in response to user actuation of a send actuator, sending the email message, including the message content and the event details, to one or more recipients.

* * * * *